(12) United States Patent
DeCusatis et al.

(10) Patent No.: US 6,359,709 B1
(45) Date of Patent: *Mar. 19, 2002

(54) METHOD FOR OPEN FIBER CONTROL PROPAGATION IN MULTI-LINK FIBEROPTIC CONNECTIONS

(75) Inventors: Casimer Maurice DeCusatis, Poughkeepsie, NY (US); William Eric Hall, Clinton, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/181,427

(22) Filed: Oct. 28, 1998

(51) Int. Cl.[7] .......................... H04B 10/08; H04B 10/16
(52) U.S. Cl. ..................................... 359/110; 359/179
(58) Field of Search ................... 359/174, 176, 359/177, 179, 173, 110; 375/213; 370/243

(56) References Cited

U.S. PATENT DOCUMENTS

| | | | |
|---|---|---|---|
| 5,136,410 A | | 8/1992 | Heiling et al. ............... 359/110 |
| 5,515,361 A | * | 5/1996 | Li et al. ....................... 370/222 |
| 5,673,132 A | * | 9/1997 | Carbone, Jr. et al. ....... 359/177 |
| 5,956,168 A | * | 9/1999 | Levinson et al. ........... 359/152 |

FOREIGN PATENT DOCUMENTS

| | | | |
|---|---|---|---|
| JP | 58-46733 A | * | 3/1983 |
| JP | 59-119935 A | * | 7/1984 |
| JP | 1-125133 A | * | 5/1989 |

* cited by examiner

Primary Examiner—Jason Chan
Assistant Examiner—Christina Y. Leung
(74) Attorney, Agent, or Firm—Lily Neff, Esq.; Floyd A. Gonzalez, Esq.; Heslin Rothenberg Farley & Mesiti P.C.

(57) ABSTRACT

A fiberoptic communications method is presented which allows an open-link condition on one link of a multi-link fiberoptic connection to be propagated to other links of the connection while satisfying the Open Fiber Control safety standard. Each link comprises a duplex link and at least one optical repeater is employed. The at least one optical repeater is adapted to propagate an open-link condition in one link of the multiple duplex links between the links of the fiberoptic connection. Propagating the open-link condition can be accomplished using an out band signal, an electrical wrap mode, or a hybrid approach using both an out band signal and electrical wrap mode. Automatic propagation of a closed-link condition is provided once the originally opened link is closed.

13 Claims, 7 Drawing Sheets

METHOD FOR OPEN FIBER CONTROL PROPAGATION IN MULTI-LINK FIBEROPTIC CONNECTIONS

CROSS-REFERENCE TO RELATED APPLICATIONS

This application contains subject matter which is related to the subject matter of the following applications, each of which is assigned to the same assignee as this application and filed on the same day as this application. Each of the below-listed applications is hereby incorporated herein by reference in its entirety:

"SYSTEM FOR OPEN FIBER CONTROL PROPAGATION IN MULTI-LINK FIBEROPTIC CONNECTIONS" by DeCusatis et al., Ser. No. 09/181134; and "OPEN FIBER CONTROL PROPAGATION IN MULTI-LINK FIBEROPTIC CONNECTIONS" by DeCusatis et al., Ser. No. 09/181,133.

TECHNICAL FIELD

The invention relates generally to safety systems that limit the amount of radiant energy that can be emitting from an open optical fiber or a transmitter port in an optical communication link. More particularly, the invention relates to a safety system for automatically propagating shutting down and restoring of links in a multi-link fiberoptic connection employing the Open Fiber Control safety standard, wherein the automatic shutting down and/or restoring of the links is in response to opening or closing of one or more of the links in the connection.

BACKGROUND OF THE INVENTION

Communication between computer systems usually involves a sending system (sender) sending a command to a receiving system (receiver) over a link used to couple the sender and the receiver. The receiving system then, typically, sends a response back over the link to the sending system.

One example of a link used by International Business Machines Corporation to communicate between a sender and a receiver is an intersystem channel (ISC) link. In particular, an intersystem channel link couples an intersystem channel adapter on one system (e.g., a central processor) that may be used for sending or receiving messages with an intersystem channel adapter on another system (e.g., a coupling facility that contains data shared by any central processor coupled thereto) that may also be used for sending or receiving messages.

An ISC link is a fiberoptic link which employs the laser safety feature entitled "Open Fiber Control" (OFC). One implementation of an OFC module is described in U.S. Pat. No. 5,136,410, entitled "Optical Fiber Link Control Safety System", which is hereby incorporated herein by reference in its entirety. The OFC standard requires that in order for fiberoptic transceivers at each end of a link to function, there must be a closed link between the duplex transmitter/receiver pairs at the ends of the link. If, for example, a link is opened due to a pulled connection or broken fiber, then the hardware must automatically shut off the transmitters at both ends of the link. At this point, the standard dictates that the transmitters will send out a short optical pulse, for example, every ten seconds, trying to reestablish the link. When the fiber is reconnected, the link will automatically resume operation pursuant to receipt of these short optical pulses.

In order to extend the distance of an ISC link from, for example, 3 kilometers to over 20 kilometers, it is desirable to insert repeaters into the ISC link. Unfortunately, a conventional optical repeater cannot adequately propagate a loss of light signal. The American National Standards Institute (ANSI) transceiver implementation, and the OFC timing requirements, make it impossible to directly propagate loss of light across the optical repeater. The OFC timing requirements are part of the ANSI Fiber Channel Standard itself; e.g., reference the American National Standards Institute (ANSI) Fiber Channel Physical and Signaling Interface (FC-PH), document no. X3.230 (1997), available through Global Engineering Documents of Santa Anna, Calif. Thus, if a first link of a multi-link connection is opened, the other links of the connection will not drop light (and vice versa). This causes problems for the system, including a serious data integrity issue because the invalidate bit at the devices coupled to the multi-link connection will not be set properly unless the other links of the connection also show loss of light.

In view of the above, a need exists in the art for an optical repeater capable of extending the practical length of a communication link which employs Open Fiber Control (OFC). More particularly, a method to artificially propagate loss of light over an extended ISC link, or any data link using Open Fiber Control per the Fiber Channel Standard, is needed.

DISCLOSURE OF THE INVENTION

Briefly summarized, this invention comprises in one aspect a method for propagating a link condition within a multi-link fiberoptic connection, wherein the link condition occurs on at least one link of the multi-link connection. The method includes: detecting an open-link condition on one link of the multi-link fiberoptic connection; and automatically propagating the open-link condition between links of the multi-link fiberoptic connection in accordance with Open Fiber Control specified in the American National Standards Institute Fiber Channel Standard to shut down at least some optical transmitters within the multi-link fiberoptic connection.

Those skilled in the art will note from the description provided herein that there are numerous advantages to the techniques of the present invention. For example, this invention allows all devices, processors, and repeaters attached to a communication channel with multiple link segments to be aware when a link segment opens and physical connectivity is lost. Propagation of the open-link condition complies with industry standard timings for Open Fiber Control, as specified by the ANSI Fiber Channel Standard. This means that a repeater in accordance with the present invention will interoperate with any device built by multiple vendors in the industry today. Another advantage is that the invention can be implemented in hardware only, which makes the processing time faster and simplifies the implementation. Further, implementation of the invention allows OFC propagation without any changes to hardware of the attached devices at the end of the multi-link connection. The only changes required are to the repeaters, at least in the hybrid processing approach disclosed herein, so the devices can interoperate with systems already in the field.

A further advantage is that the invention prevents deadlock conditions in which one or more links do not automatically restore themselves because different repeaters are continually signaling each other to turn off link segments. Further, this invention automatically restores physical connectivity when any open-link segment is closed again. The invention applies to both standard repeaters, i.e., single input/output and to multiplexers, i.e., multiple inputs/single output, for any link which uses OFC at any data rate. Also, the invention can be extended to any number of repeaters in a daisy chain arrangement.

As a still further advantage, the invention does not require that all transceivers in the link be equipped with electrical wrap capability if the attached device hardware can be modified to recognize an out band signal propagation. Further, propagation of the OFC open-link condition does not require a separate wire, fiber or communications path between adjacent repeaters and attached devices. All communication is carried out over the existing duplex fiberoptic links. The invention does not violate existing laser safety certifications on the attached devices or repeaters. Another advantage is that the invention enables the construction of repeaters for OFC links, therefore it allows construction of parallel computer processor systems at extended distances wherein fiberoptic links with OFC are relied upon to interconnect the multiple processors. By being able to move the processors in such a parallel system longer distances from each other, the possibility for disaster recovery is enhanced.

As another advantage, by applying the invention to multiplexers, it becomes possible to construct parallel computer process systems at extended distances without requiring large numbers of optical fibers between the locations. Use of multiplexers can reduce the number of inter-site links by combining many data channels over one physical link. Reducing the number of inter-site links both simplifies the installation and greatly reduces the cost of installing fiber.

Another advantage of the invention is that by specifying an out band signal as disclosed herein, both disparity balance and DC balance are maintained. This keeps the optical receivers from drifting out of specification during a loss of light condition, so that the link can reinitialize quickly when connectivity is restored.

A still further advantage of the invention is that no special data characters or sequences are needed to convey loss of light state across a link, so it is not necessary to modify software running over the link to reserve special control sequences or characters for the condition.

BRIEF DESCRIPTION OF THE DRAWINGS

The above-described objects, advantages and features of the present invention, as well as others, will be more readily understood from the following detailed description of certain preferred embodiments of the invention, when considered in conjunction with the accompanying drawings in which.

BEST MODE FOR CARRYING OUT THE INVENTION

Intersystem channel (ISC) links used by International Business Machines Corporation to communicate between senders and receivers, as well as certain American National Standards Institute (ANSI) Fiber Channel Standard (FCS) data links, employ a laser safety feature called "Open Fiber Control" (OFC). The relevant industry standards for laser safety in the United States are ANSI Z136.1, "Standard for the Safe Use of Lasers" (1993 revision) and ANSI Z136.2, "Standard for the Safe Use of Optical Fiber Communication Systems Utilizing Laser Diodes and LED Sources" (1996–97 revision). Elsewhere in the world, the relevant standard is International Electro-technical Commission (IEC/CEI) 825 (1993 revision). International Business Machines Corporation's implementation of an Open Fiber Control is described, for example, in U.S. Pat. No. 5,136,410 for a fiberoptic module. This patent applies to fiberoptic modules used by IBM on ISC links. The optics are referred to as "Gigabit Link Modules" (GLMs), and are available through various companies including International Business Machines, Hitachi and Siemens.

Figure 1:
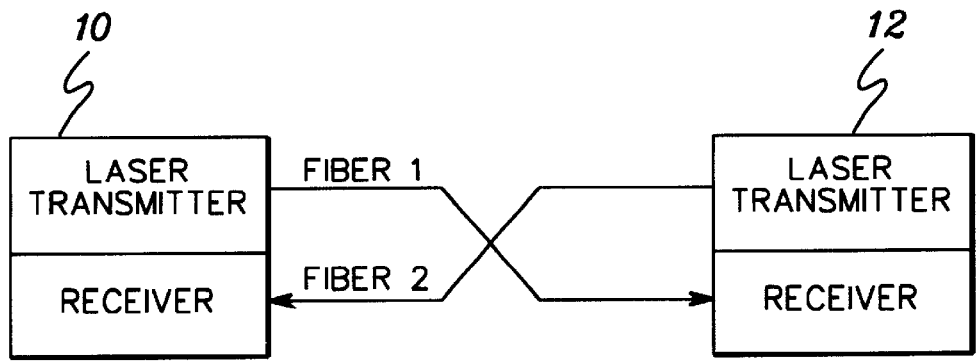
FIG. 1 is a block diagram of a duplex link between a first transceiver 10 and a second transceiver 12.

Open Fiber Control means that in order for fiberoptic transceivers to function, there must be a closed link between a duplex transmitter/receiver pair at both ends of the link. As shown in FIG. 1, a first transceiver 10 is coupled to a second transceiver 12 across a duplex fiberoptic link which includes fiber 1 and fiber 2. If either fiber 1 or fiber 2 is opened, i.e., enters an open state condition characterized by a lack of a closed path between the transmitter and receiver at either end of the link, then the hardware must automatically "shut down" the transmitters on each end of the link. In accordance with OFC, this "shutting down" of the transmitters means that the transmitters enter a low duty cycle mode where each transmitter outputs an optical pulse at a very low duty cycle, for example, every 10 seconds trying to reestablish the link. When the fiber is reconnected, the link will automatically perform a handshake and resume operation.

By way of example, if fiber 1 breaks, the receiver (R) at transceiver 12 sees a loss of data coming in and signals the associated laser transmitter (T) at transceiver 12 to enter low duty cycle mode. The low duty cycle mode employs a low power pulse that is guaranteed not to be injurious if viewed by a human. For example, a 625 microsecond wide pulse at 10 second intervals with low power might be used. Once this transmitter (T) at transceiver 12 enters low duty cycle mode, the receiver (R) at transceiver 10 sees a loss of data and instructs its transmitter (T) to go into low duty cycle mode. The inverse process is automatically repeated once fiber 1 is reconnected. In particular, upon reconnection of a broken fiber, a short handshaking process is undertaken to reestablish communication between the transceivers at opposite ends of the link, thereby establishing a closed-loop condition between the transceivers.

Figure 2:
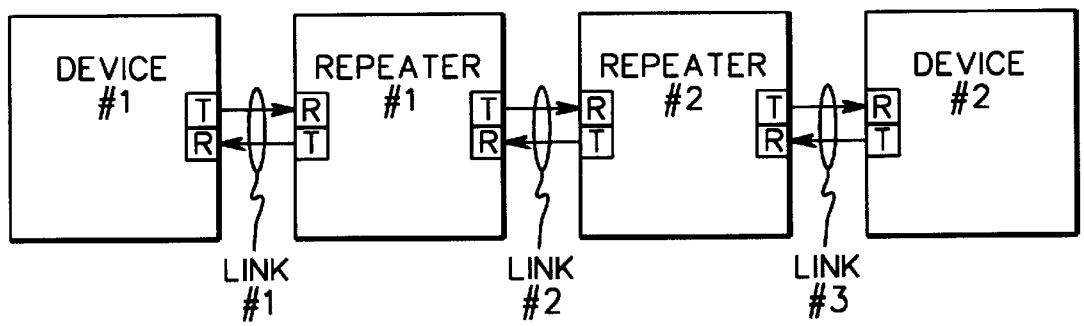
FIG. 2 is a block diagram of a fiberoptic communication system employing Open Fiber Communication (OFC) propagation in accordance with the present invention.
Figure 3:
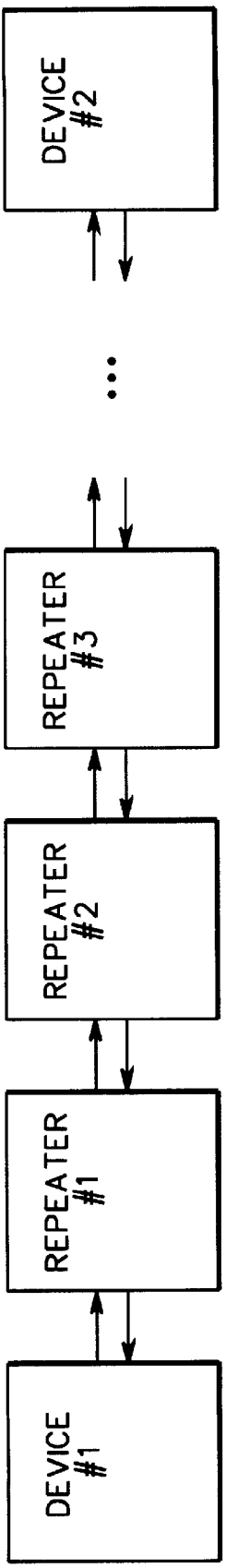
FIG. 3 is a block diagram of a further embodiment of a fiberoptic communication system employing open-link and closed-link OFC propagation in accordance with the present invention.

FIGS. 2 & 3 depict alternate embodiments of a fiberoptic communication system to be controlled in accordance with the present invention. Each of these systems comprises an OFC propagation system wherein detection of an open-link condition in one link is automatically propagated the length of the system in both directions in an OFC compliant manner. As a specific application, it may be desirable to insert one or more optical repeaters into an ISC link, in order to extend the distance of an ISC link and thereby enable parallel systems at longer distances. Note that an "optical repeater" (or repeater), as used herein, is intended to be inclusive of various devices including a multiplexer, such as a wavelength division multiplexer.

As briefly noted, ANSI standard transceiver implementations and OFC timing requirements make it impossible to directly propagate a loss of light signal from one link through a chain such as depicted in FIG. 2 or FIG. 3. This means, for example, that if link 1 between device 1 and repeater 1 is broken (i.e., enters an open-state condition), then the link between repeater 2 and device 2 will not automatically drop light (and vice versa). This causes a number of problems for the system, including a serious data integrity problem because the invalidate bit will not be set properly at both device 1 and device 2 unless all links between the two devices show loss of light.

More particularly with reference to FIGS. 2 & 3, each device and repeater is shown to have a transmitter (T) and a receiver (R). If link 1 is opened, then all transmitters on repeater 1, repeater 2, device 1 and device 2 must "turn off", i.e., enter the low duty cycle mode. The same must happen if either link 2 or link 3 is opened, or if multiple links are substantially simultaneously opened. Further, when the opened link is closed, each transistor must turn itself on automatically. In addition, any signal propagated across the links must contain enough transitions to avoid causing problems with the AC coupled optical receivers, and must maintain both disparity balance and DC balance on the data. Any such signal must also not be confused with other data on the link, or misinterpreted by the hardware. It is further required that the link propagate loss of light and sequentially restore itself to operating conditions fast enough to avoid complications with the channel interface code. Recovery must work under all possible combinations. To summarize, a technique is required to artificially propagate detection of loss (or reoccurrence) of light over an extended optical link, such as an ISC link or any data link per Fiber Channel Standard, while being in compliance with OFC.

Figure 4:
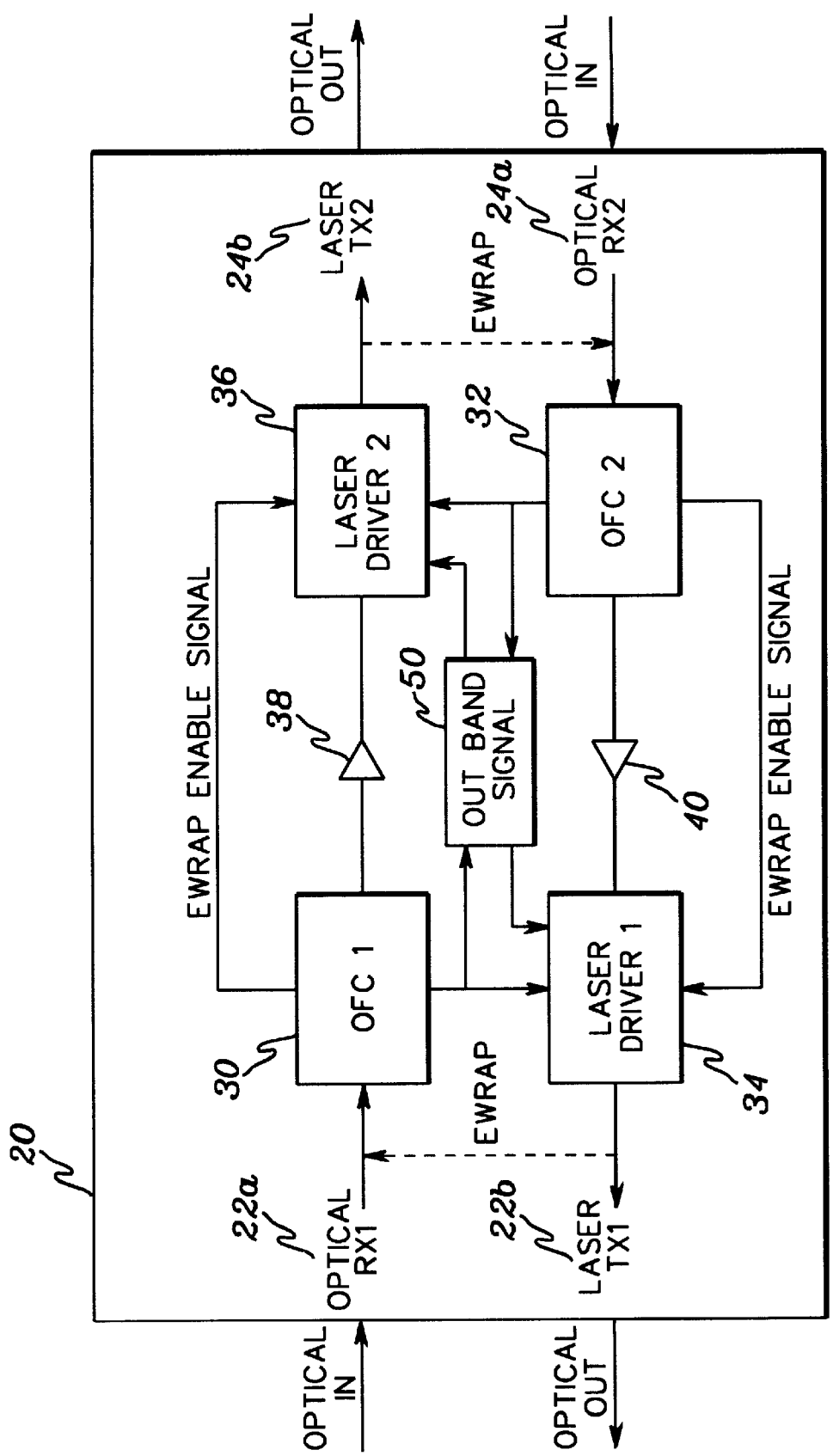
FIG. 4 is a block diagram of one embodiment of an optical repeater implementing open-link and closed-link OFC propagation in accordance with the present invention.

This invention satisfies this need by providing various techniques for artificially propagating loss (or reoccurrence) of light across an optical fiber having multiple links. FIG. 4 represents one embodiment of an optical repeater 20 in accordance with one of these techniques. As shown, repeater 20 includes an optical receiver (RX1) 22a and a laser transmitter (TX1) 22b at one end and an optical receiver (RX2) 24a and laser transmitter (TX2) 24b at the opposite end. Each receiver receives optical data from one link of a respective duplex link, and sends converted electrical signals to a respective open fiber control circuit, i.e., OFC 1 30 or OFC 2 32. In normal operation, this electrical data is forwarded from the OFC circuit through an amplifier 38, 40 to laser driver 2 36 or laser driver 1 34 for driving laser TX2 24b or laser TX1 22b as shown. The driven laser transmitter outputs the amplified optical signal corresponding to the optical input received at RX1 or RX2.

As one specific example, under normal operation optical data is input to optical receiver RX1 and the optical receiver converts the data to electrical data. OFC circuit 30 detects transitions at the appropriate data speed (e.g., gigahertz) and passes the electrical data to amplifier 38. The data is amplified and fed to laser driver 2 36. The laser driver then drives transmitter 24b to output the amplified optical signal corresponding to the received optical input.

In accordance with one embodiment of the present invention, an open-link (or open-state) condition is propagated across repeater 20 by generating an out band signal 50 when open fiber circuitry 30 or 32 detects a loss of normal electrical data (for example, data at 1 gigahertz) on the optical in line. If no data is received or optical pulses are received corresponding to the low duty cycle mode, then the OFC circuitry is configured to interpret this as an open link condition and the circuitry sends a signal to generate an out band signal 50. In one embodiment, the out band signal may comprise a 625 kilohertz sinusoidal or square-wave signal, which is a higher frequency signal than the conventional low duty cycle signal, and still well below a normal data signal. Such an out band signal is today well outside the normal operating range of a duplex link; and further, such a signal satisfies the condition that all optical signals between repeaters include frequent transitions in order to keep the AC coupled receivers within the repeaters operating properly. This out band signal is also preferably disparity balanced, i.e., has an equal number of 1s and 0s. The out band signal is forwarded, for example, to laser driver 1 or laser driver 2 depending on the direction of signal propagation, for broadcast out through the associated optical transmitter, i.e., laser TX2 or laser TX1.

Receipt of an out band signal at the next adjacent repeater or device can, in one embodiment, cause that repeater or device to "shut down" its transmitter within the receiving transceiver, i.e., place this transmitter in the low duty cycle mode, and to propagate the out band signal to a next repeater (or device) of the multi-link fiberoptic connection through the out bound transceiver at the other end of the repeater. In such an embodiment, the Open Fiber Control circuitry of each repeater and device in the system would need to be modified in order to recognize and propagate the out band signal. Because the out band signal is distinct from the normal operating signal (e.g., 1 gigahertz), and the low duty cycle pulse (e.g., a pulse every 10 seconds), the OFC circuit modification is straightforward to one skilled in the art. A variation on this implementation is depicted in the circuitry of FIG. 4 and the process of FIGS. 5 & 6.

Generally stated, in addition to generating the out band signal, an electronic wrap (EWRAP) mode can be employed (depending on the direction of signal propagation) to electrically wrap data from, for example, laser driver 2 to the input of OFC 2, or from laser driver 1 to the input of OFC 1. This action would prevent electrical data from being output through transmitter TX2 or TX1, respectively. Which transmitter is placed into EWRAP depends upon the direction that the OFC open signal is being propagated.

For example, assume that a second repeater is coupled to receive optical output from repeater 20, and that an open-link condition is received by optical receiver RX1 of repeater 20. In such a case, the out band signal is provided through laser driver 2 and laser TX2 to repeater 2, which is also assumed to have a first transceiver and a second transceiver connected as shown in FIG. 4. The first OFC circuit of repeater 2 notes receipt of an out band signal on input RX1, and "turns off" laser transmitter TX1, i.e., places the transmitter in low duty cycle mode. In addition, an enable signal is generated to place transmitter TX2 of repeater 2 in "electrical wrap" (EWRAP) mode so that the output of repeater 2 to a third repeater or a device shows loss of light, i.e., comprises an open-link condition.

The EWRAP mode essentially means all electrical data output from laser driver 2, for example, is diverted to the associated Open Fiber Control circuitry OFC 2 (as shown in phantom in FIG. 4). Since no data is driven to laser transmitter TX2, no optical output is provided and the next repeater or device in the chain identifies this lack of data as an open-link condition. The hybrid "out band/EWARP" process is repeated as needed to propagate the open state condition across the multi-link fiberoptic connection. Again, by placing a transceiver in EWRAP mode, the link between that repeater and the next repeater/device will show loss of light, thereby further propagating the signal. Note that there is no laser inhibit signal available on many optical repeaters, such as ISC modules, and therefore, this function is provided by the electrical wrap, which is a diagnostic function typically provided on today's optical repeaters/multiplexers.

As a further alternate embodiment of the present invention, an open-link condition could be propagated across a multi-link fiberoptic connection by employing only the electrical wrap mode if the particular technical implementation allows its use. With such an embodiment, upon a first repeater identifying an open-link condition at one of its inputs, the condition is propagated to a next repeater/device simply by placing its out bound transmitter into EWRAP mode in the direction of signal propagation, thereby showing loss of light on its output link to the next repeater/device. The process would be repeated until reaching the devices at the ends of the multi-link fiberoptic connection.

Figure 5:
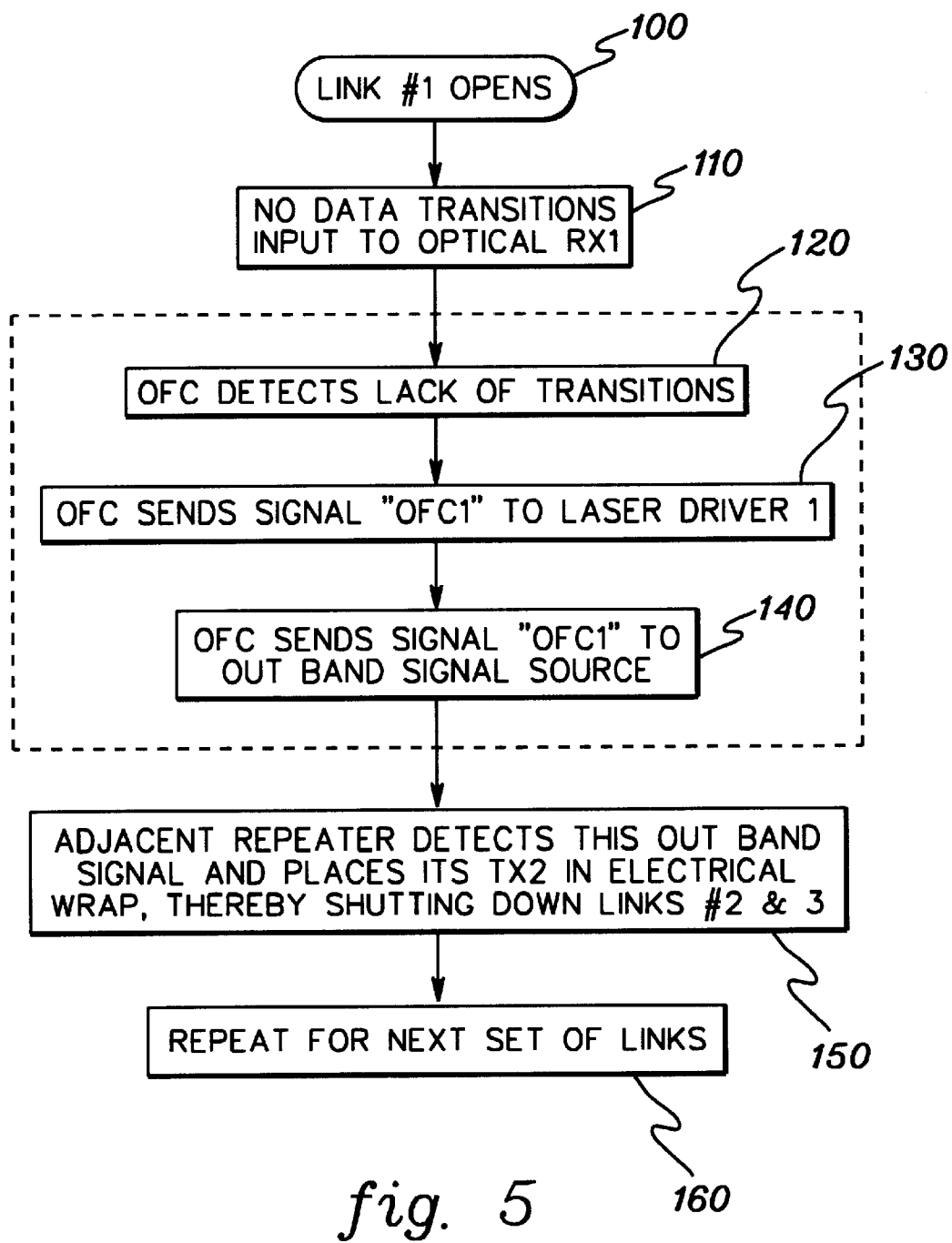
FIG. 5 is a flowchart of one process embodiment for propagating an open-link condition between multiple optical repeaters in accordance with the present invention.
Figure 6:
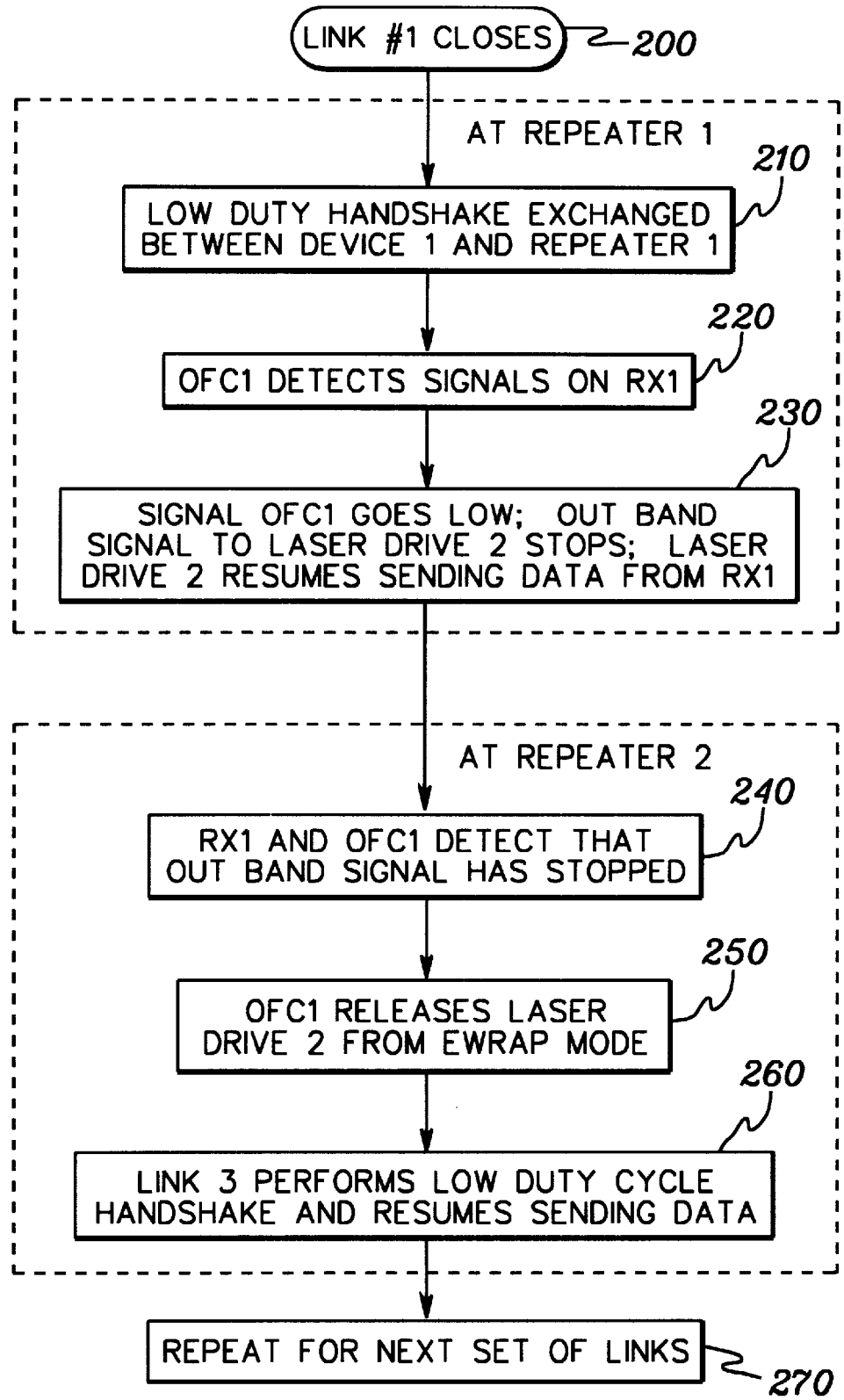
FIG. 6 is a flowchart of one process embodiment for propagating a closed-link condition within a fiberoptic communication system in accordance with the present invention.

FIGS. 5 & 6 depict the hybrid propagation embodiment discussed above wherein a link, link 1, is first opened and then closed. In this hybrid process, both the out band signal and the EWRAP mode are alternately used to propagate an open-link condition across the multi-link connection. Referring first to FIG. 5, it is assumed that a break or opening occurs in link 1 of FIG. 2 and that each repeater is implemented in accordance with the embodiment of FIG. 4. Upon link 1 opening 100, no data transitions will be input to optical receiver RX1 110. The associated OFC circuitry detects this lack of data 120 and sends a signal "OFC1" to laser driver 1. This signal causes laser driver 1 to ignore any input from receiver RX2, and instructs the driver to output low duty cycle pulses on transmitter TX1 as explained above. This will in turn cause device 1 at the other end of link 1 to put its laser transmitter into pulse mode, i.e., if fiber 1 is still intact. If both fibers of link 1 are opened, then the laser at device 1 is already in low duty cycle mode because its receiver saw no transitions.

The OFC circuitry also sends signal "OFC1" to the out band signal source 140 (FIG. 4) for generating the out band signal. The out band signal (for example, a 625 kHz sinusoid) is input to laser driver 2, which then ignores other inputs and sends the out band signal over link 2 via laser transmitter TX2. As described further below, this preferably only occurs if the driver's transceiver is not already receiving an out band signal across link 2.

The second repeater, repeater 2, will detect the out band signal at its link 2 input and place its transmitter TX2 at its output in electrical wrap, thereby shutting down link 3 as well 150. Once transmitter TX2 is placed in EWRAP, link 3 is effectively opened, and any further repeater/device coupled to the link (such as shown in FIG. 3) would continue propagation of the open-link condition using the above-summarized processing 160.

As noted, FIG. 6 depicts an example of reactivation processing in accordance with the present invention upon closure of a previously opened link. In this example, it is assumed that link 1 was opened and is now being closed. Further, the environment of FIGS. 2, 4 & 5 is assumed.

Upon closing link 1 200, a low duty handshake is exchanged between device 1 and repeater 1 210, as will be understood by one skilled in the art. Receiver RX1 on repeater 1 receives these transitions, and its open fiber control circuitry OFC1 detects the existence of the transitions 220 and changes the OFC1 signal to a low signal. This results in the out band signal to laser driver 2 stopping, thereby allowing laser drive 2 to resume sending amplified data from receiver RX1 230 to transmitter TX2.

At repeater 2, receiver RX1 and open fiber control circuit 1 detect that the out band signal previously being transmitted from repeater 1 has stopped 240. Upon detecting this, the OFC circuitry 1 releases laser drive 2 from EWRAP mode 250. Link 3 thereafter performs a low duty cycle handshake and resumes communicating data 260. This hybrid process is repeated for each set of links in the fiberoptic communication system 270. Note that the same process would be reversed if, for example, link 3 was first opened and then reclosed. Further, the processing examples of FIGS. 5 & 6 generalize to a multiple repeater daisy chain. In addition, note that a repeater recovering from electrical wrap is not required to wait for the 10 second OFC pulse once a line is reestablished, but rather can generate the OFC handshake immediately, thereby ensuring that the recovery time of the link is fast.

Figure 7:
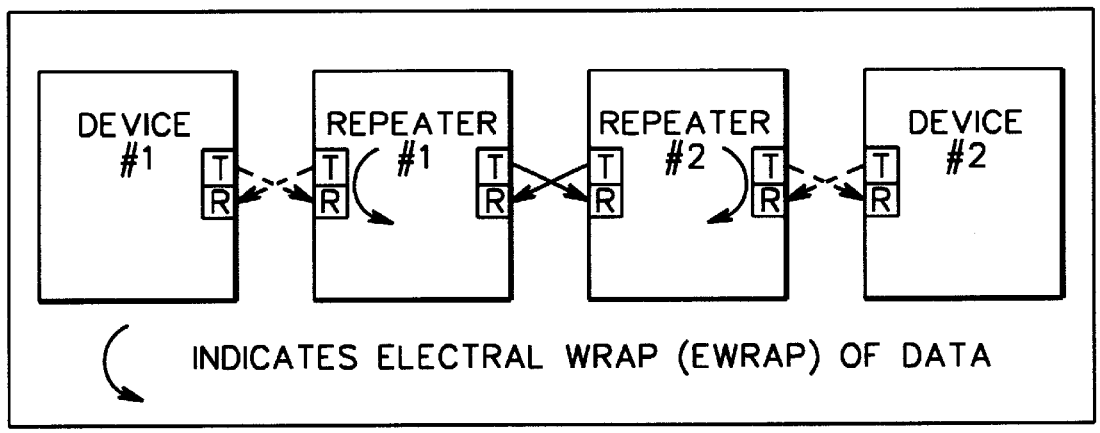
FIG. 7 is a block diagram of a fiberoptic communication system in accordance with the present invention illustrating a potential deadlock condition addressed by the present invention.

Those skilled in the art will recognize that the state machine to be implemented in accordance with the hybrid processing approach of the present invention (or the EWRAP mode propagation approach of the present invention) could conceivably result in the repeaters being locked open. For example, if both link 1 and link 3 open substantially simultaneously, then repeater 1 will send an out band signal to repeater 2 to put its out bound transmitter TX2 in EWRAP mode, while repeater 2 will send an out band signal to repeater 1 to put its out bound transmitter TX1 in EWRAP mode. The result is depicted in FIG. 7 wherein the phantom connections between device 1 and repeater 1 and device 2 and repeater 2 are intended to show an open-state condition. If this occurs, there is no way to reestablish the links automatically since repeater 1 and repeater 2 are both in reinforcing EWRAP modes.

To prevent this, additional logic is preferably included in, for example, the OFC circuitry or the out band signal source circuitry to ensure that a repeater can only send an out band signal (or enter EWRAP) if it is not already receiving an out band signal (or EWRAP enable signal) from an adjacent repeater. Thus, it will not send its own out-of-band sequence without first releasing its own link from EWRAP. Those skilled in the art will understand that a state machine can readily be developed to cover all possible states, including power on of the repeaters, and devices in different orders. It can be proven that making each repeater aware of its own state is the only way to guarantee that a deadlock condition will not occur.

Figure 8:
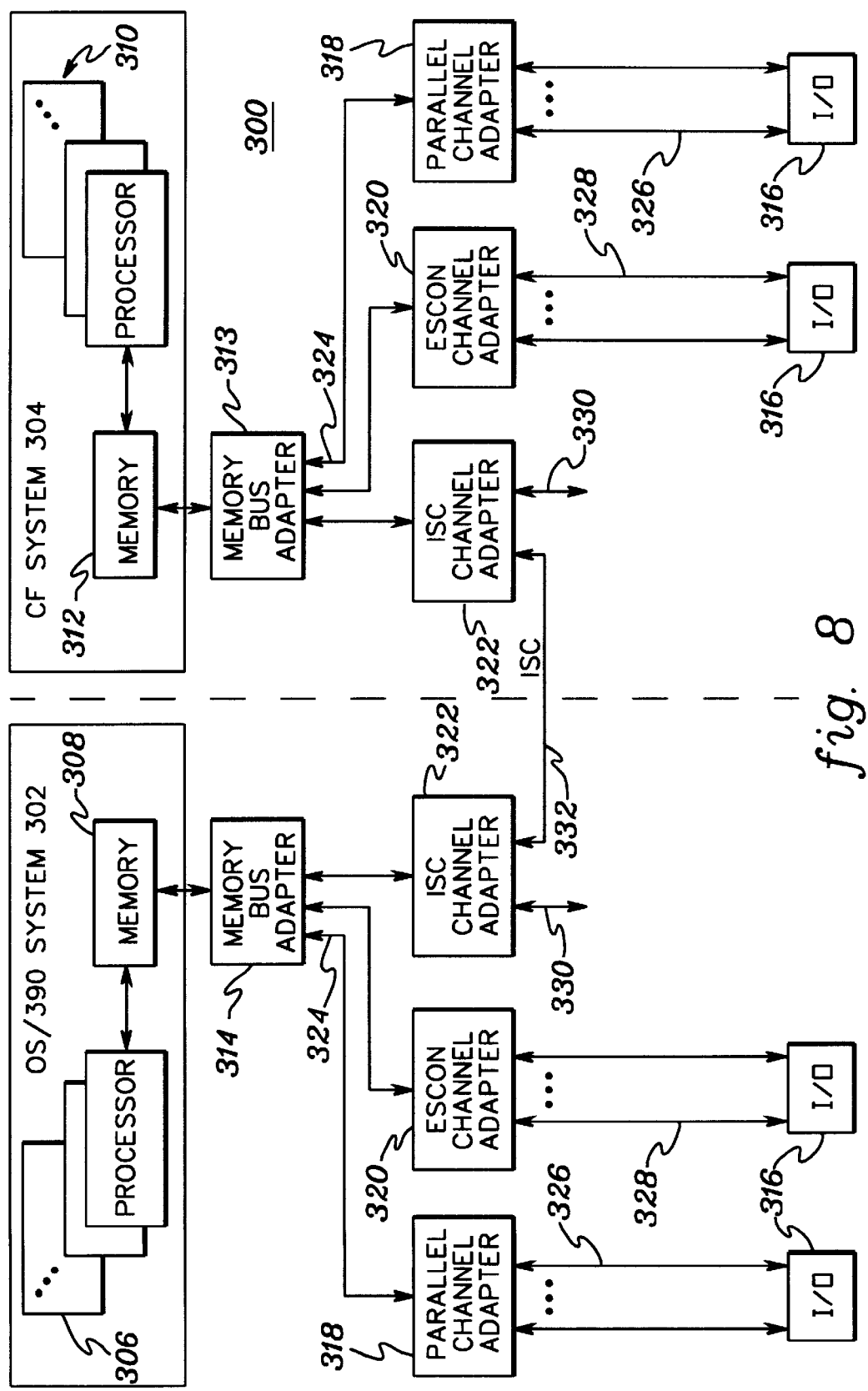
FIG. 8 is a block diagram of one example of a computer environment incorporating and using the open-link and closed-link condition propagating capabilities of the present invention.

One specific embodiment of a computing environment incorporating and using the open fiber control propagation techniques of the present invention is depicted in FIG. 8 and described in detail below. Computing environment 300 is based, for instance, on the Enterprise Systems Architecture (ESA)/390 offered by International Business Machines Corporation. ESA/390 is described in an IBM publication entitled *Enterprise Systems Architecture/390 Principles of Operation,* IBM publication no. SA22-7201-04, June 1997.

Computing environment 300 includes, for instance, one or more central processing complexes (CPCs) 302 coupled to at least one coupling facility 304, each of which is described below.

Each central processing complex 302 includes one or more central processors 306 (central processing units) and main memory 308, which is accessed by the central processors. Each central processor may execute an operating system, such as the OS/390 or Multiple Virtual Storage (MVS)/ESA Operating System offered by International Business Machines Corporation.

Coupling facility 304 is a shareable facility, which includes one or more central processors 310 and storage 312, which is indirectly accessible by processors 306 and directly accessible by processors 310. Each central processor 310 may execute coupling facility control code to perform operations requested by processors 306. In one embodiment, coupling facility 304 is a structured-external storage processor (SES).

Aspects of the operation of a coupling facility are described in detail in such references as Elko et al., U.S. Pat. No. 5,317,739, entitled "Method and Apparatus for Coupling Data Processing Systems", issued May 31, 1994; Elko et al., U.S. Pat. No. 5,561,809, entitled "In a Multiprocessing System Having a Coupling Facility, Communicating Messages Between the Processors and the Coupling Facility in Either a Synchronous Operation or an Asynchronous Operation", issued on Oct. 1, 1996; Elko et al., U.S. Pat. No. 5,706,432, entitled "Mechanism for Receiving Messages at a Coupling Facility", issued Jan. 6, 1998; and the patents referred to therein.

Multiple central processing complexes and coupling facilities may be interconnected. Further, each central processing complex and/or coupling facility processor may be logically partitioned, such that it can run multiple instances of the OS/390 and/or coupling facility control code.

Central processing complex 302 and coupling facility 304 are each coupled to a memory bus adapter 314. Memory bus adapter 314 provides assistance in fetching data from and storing data in memory. In particular, the memory bus adapter is used to couple the memory to various peripheral components, such as input/output (I/O) devices 316. As examples, the input/output devices include disk drives, tape drives, local area network (LAN) attachments, and wide area network (WAN) attachments.

In one embodiment, in order to couple the memory bus adapters to the I/O devices, each memory bus adapter 314 is coupled to one or more channel adapters 318, 320 via memory interfaces, referred to as "self-timed interfaces" (STIs) 324. The channel adapters then provide the I/O interface attachment points to the I/O devices. As examples, one of the channel adapters is a parallel channel adapter 318, which provides a parallel channel interface 326 to I/O devices 316; and another channel adapter is an ESCON channel adapter 320, which provides an ESCON channel interface 328 to I/O devices 316. In addition to the above, an intersystem channel (ISC) adapter 322, which provides an intersystem channel interface 330 to, for example, another central processing complex, is also coupled to the memory bus adapter via STI 324.

ISC link 332 couples the ISC channel adapters 122 associated with OS/390 system 302 and coupling facility system 304. This link is a fiberoptic link which typically employs the Open Fiber Control laser safety feature. In accordance with the present invention, the OFC propagation technique presented herein allows multiple repeaters, such as wavelength division multiplexers, to be inserted into the ISC link 332, thereby allowing greater physical separation between the central processing complexes and the coupling facility system. Again, however, the computing environment depicted in FIG. 8 is presented by way of example only. The features of the present invention can be applied to any duplex multi-link fiberoptic connection which is to employ the Open Fiber Control laser safety feature. For example, the present invention can be used to artificially propagate loss of light over a data link using open fiber control per ANSI Fiber Channel Standard.

The present invention can be included, for example, in an article of manufacture (e.g., one or more computer program products) having, for instance, computer usable media. This media has embodied therein, for instance, computer readable program code means for providing and facilitating the capabilities of the present invention. The articles of manufacture can be included as part of the computer system or sold separately.

Additionally, at least one program storage device readable by machine, tangibly embodying at least one program of instructions executable by the machine, to perform the capabilities of the present invention, can be provided.

The flow diagrams depicted herein are provided by way of example. There may be variations to these diagrams or the steps (or operations) described herein without departing from the spirit of the invention. For instance, in certain cases, the steps may be performed in differing order, or steps may be added, deleted or modified. All of these variations are considered to comprise part of the present invention as recited in the appended claims.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

What is claimed is:

1. A method for propagating a link condition within a multi-link fiberoptic connection, said link condition occurring on one link of said multi-link connection, said method comprising:

detecting an open-link condition in one link of said multi-link fiberoptic connection, each link of said multi-link fiberoptic connection comprising a duplex fiberoptic link; and automatically propagating said open-link condition between links of said multi-link fiberoptic connection to shut down at least some optical transmitters within said multi-link fiberoptic connection, wherein said automatically propagating is compliant with the Open Fiber Control specified in the American National Standards Institute Fiber Channel Standard, including compliant with timings of the Open Fiber Control.

2. The method of claim 1, wherein said multi-link fiberoptic connection comprises multiple transceivers, and said at least some optical transmitters comprise at least some transmitters of said multiple transceivers, two transceivers of said multiple transceivers being disposed within a first repeater of said multi-link fiberoptic connection, said first repeater comprising a first transceiver coupled to a first link and a second transceiver coupled to a second link, wherein said detecting comprises detecting an open-link condition in one of said first link and said second link, and said automatically propagating comprises generating an out band signal for output on the other of said first link and said second link in response to said open-link condition, wherein said out band signal comprises a low power, non-data signal representative of said open-link condition.

3. The method of claim 2, wherein said detecting detects said open-link condition on said first link and said out band signal is output on said second link in response thereto by said automatically propagating, and wherein said multi-link fiberoptic connection further comprises a second repeater coupled to said second link, said second repeater having a third transceiver coupled to said second link and a fourth transceiver coupled to a third link of said multi-link fiberoptic connection, and wherein said automatically propagating further comprises receiving said out band signal at said third transceiver and responding thereto by placing said fourth transceiver in electronic wrap mode whereby optical signals are prevented from being output to said third link, thereby effectively placing an open-link condition on said third link.

4. The method of claim 3, further comprising a third repeater having a fifth transceiver coupled to said third link and a sixth transceiver coupled to a fourth link, and wherein said automatically propagating comprises detecting said open-link condition on said third link, and responding thereto by placing said fifth transceiver in low duty cycle mode and automatically generating an out band signal to be output by said sixth transceiver onto said fourth link.

5. The method of claim 4, further comprising repeating alternating of shutting down an adjacent link by generating said out band signal for output thereon and shutting down a next adjacent link by placing an out bound transceiver thereof in electronic wrap mode.

6. The method of claim 4, wherein said placing of said fourth transceiver in electronic wrap mode comprises first determining whether said second repeater is already receiving an out band signal from said third repeater, and placing said fourth transceiver in electronic wrap only if said third repeater is not already sending an out band signal to said second repeater.

7. The method of claim 2, wherein said detecting detects said open-link condition on said first link and said out band signal is output on said second link in response thereto by said automatically propagating, and wherein said multi-link fiberoptic connection further comprises a second repeater coupled to said second link, said second repeater having a third transceiver coupled to said second link and a fourth transceiver coupled to a third link of said multi-link fiberoptic connection, and wherein said automatically propagating further comprises receiving said out band signal at said third transceiver and responding thereto by propagating said out band signal to said fourth transceiver for output on said third link.

8. The method of claim 7, wherein said multi-link fiberoptic connection comprises n additional repeaters, and wherein said automatically propagating comprises automatically propagating said out band signal across each of said n additional repeaters, thereby shutting down multiple optical transmitters of said n additional repeaters of the multi-link fiberoptic connection.

9. The method of claim 1, wherein said multi-link fiberoptic connection comprises at least one repeater, each repeater having two transceivers, a first transceiver being coupled to one link on one end of said repeater and a second transceiver being coupled to another link on another end of said repeater, wherein said at least one repeater includes a first repeater comprising a first transceiver coupled to a first link and a second transceiver coupled to a second link, wherein said detecting comprises detecting an open-link condition in said first link, and said automatically propagating comprises generating an electronic wrap (EWRAP) enable signal for placing said second transceiver in EWRAP, thereby effectively placing an open-link condition on said second link.

10. The method of claim 9, wherein said multi-link fiberoptic connection comprises multiple repeaters interconnected in a chain by multiple links, and wherein said automatically propagating comprises propagating said open-link condition across said multiple links by placing a transceiver in each repeater in EWRAP mode.

11. The method of claim 1, wherein after said automatically propagating of said open-link condition, said method further comprises detecting a closed-link condition in said one link originating said open-link condition, and responding thereto by automatically propagating said closed-link condition between links of said multi-link fiberoptic connection, thereby automatically turning on each transmitter of said at least some optical transmitters coupled to said multiple links.

12. The method of claim 11, wherein said automatically propagating said closed-link condition comprises discontinuing output of an out band signal from at least one transmitter within said multi-link fiberoptic connection, and allowing said at least one transmitter to transmit data.

13. The method of claim 11, wherein said automatically propagating said closed-link condition comprises discontinuing electronic wrapping of at least one transmitter within said multi-link fiberoptic connection, and allowing said at least one transmitter to transmit data.

* * * * *